(12) United States Patent
Omori

(10) Patent No.: US 11,536,563 B2
(45) Date of Patent: Dec. 27, 2022

(54) METHOD FOR CALIBRATING PARAMETERS OF SURFACE TEXTURE MEASURING APPARATUS

(71) Applicant: MITUTOYO CORPORATION, Kanagawa (JP)

(72) Inventor: Yoshiyuki Omori, Hiroshima (JP)

(73) Assignee: MITUTOYO CORPORATION, Kanagawa (JP)

(*) Notice: Subject to any disclaimer, the term of this patent is extended or adjusted under 35 U.S.C. 154(b) by 385 days.

(21) Appl. No.: 16/935,613

(22) Filed: Jul. 22, 2020

(65) Prior Publication Data
US 2021/0033392 A1 Feb. 4, 2021

(30) Foreign Application Priority Data

Jul. 29, 2019 (JP) .............................. JP2019-138771

(51) Int. Cl.
*G01B 21/04* (2006.01)
*G01B 5/20* (2006.01)

(52) U.S. Cl.
CPC ........... *G01B 21/042* (2013.01); *G01B 5/201* (2013.01)

(58) Field of Classification Search
CPC ........ G01B 21/042; G01B 5/201; G01B 5/28; G01B 7/282; G01B 7/312; G01B 21/045; G01B 5/20
USPC ...... 33/556, 558, 551, 553, 554; 702/94, 95; 73/1.81, 1.89, 104, 105; 356/625, 634, 356/243.1
See application file for complete search history.

(56) References Cited

U.S. PATENT DOCUMENTS

| | | |
|---|---|---|
| 8,925,367 B2 | 1/2015 | Omori et al. |
| 9,518,811 B2 | 12/2016 | Yamamoto et al. |
| 9,746,303 B2 | 8/2017 | Nakagawa et al. |
| 9,803,968 B2 | 10/2017 | Nakayama |
| 10,323,921 B2 | 6/2019 | Nakayama et al. |
| 10,514,244 B2 | 12/2019 | Nakayama et al. |
| 2019/0212121 A1 | 7/2019 | Omori |
| 2020/0003542 A1 | 1/2020 | Ishioka et al. |

FOREIGN PATENT DOCUMENTS

JP 2004-286457 A 10/2004

*Primary Examiner* — Robert R Raevis
(74) *Attorney, Agent, or Firm* — Greenblum & Bernstein, P.L.C.

(57) ABSTRACT

A method for calibrating parameters includes a measurement step that obtains measurement data by scanning a defined surface; a correction step that obtains corrected data by correcting the measurement data based on the parameters; a determination step that calculates a roundness of the corrected data and determines whether the calculated roundness is equal to or less than a predetermined value; and an adjustment step that increases or reduces at least one of the parameters when the roundness is determined to be greater than the predetermined value, and the correction step, the determination step, and the adjustment step are repeated until the roundness is determined to be equal to or less than the predetermined value.

3 Claims, 14 Drawing Sheets

Fig. 5
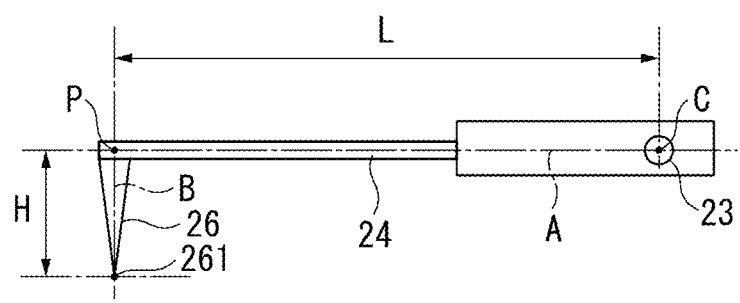
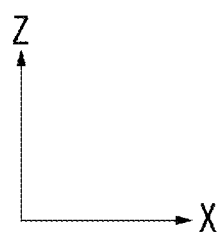

Fig. 13
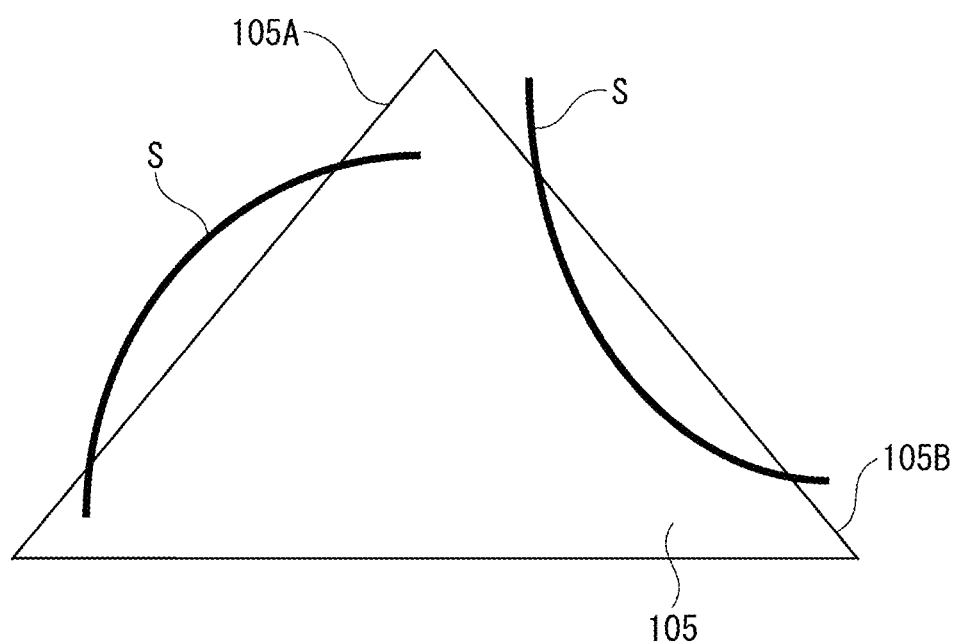
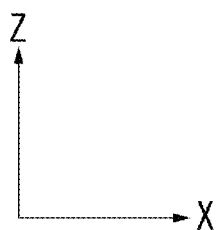

METHOD FOR CALIBRATING PARAMETERS OF SURFACE TEXTURE MEASURING APPARATUS

CROSS-REFERENCE TO RELATED APPLICATIONS

The present application claims priority under 35 U.S.C. § 119 of Japanese Application No. 2019-138771, filed on Jul. 29, 2019, the disclosure of which is expressly incorporated by reference herein in its entirety.

BACKGROUND OF THE INVENTION

1. Field of the Invention

The present invention relates to a method for calibrating parameters of a surface texture measuring apparatus.

2. Description of Related Art

Conventionally, a surface texture measuring apparatus is known which measures a surface texture of a measured object/measureable object by profiling and scanning the surface of the measured object. The surface texture measuring apparatus includes a stylus contacting the measured object, an arm supporting the stylus so as to be capable of displacing in an up/down direction, a displacement amount detection device detecting a displacement amount of the stylus, a movement mechanism that moves the stylus relative to the measured object in a measurement direction, and a movement amount detection device detecting a relative movement amount of the stylus. The displacement amount and the relative movement amount of the stylus at the time of profiling and scanning a surface of the measured object are obtained as measurement data.

Since a measurement error occurs due to a circular movement of the stylus in the surface texture measuring apparatus noted above, a correction to reduce the measurement error in the measurement data is performed. For example, Japanese Patent Laid-open Publication No. 2004-286457 discloses a correction method that uses a gain coefficient of the displacement amount detection device (parameter g), an arm length (parameter L), and a stylus length (parameter H) as respective parameters.

In order to properly perform the above correction, calibrating the respective parameters is important. For example, Japanese Patent Laid-open Publication No. 2004-286457 noted above discloses a method for batch calibration that calibrates each parameter based on measurement results obtained by measuring a predetermined calibration jig. The method for batch calibration calibrates the parameter g based on the measurement results of a step portion with a known height and calibrates the parameter H based on the measurement results of a hemisphere portion having a portion of a spherical shape. According to such a calibration method, the parameter g and the parameter H can be calibrated individually, and therefore there is no inaccuracy due to dependency of each parameter and the method can handle a wide variety of measurements.

However, the following circumstances are present in the above-noted conventional method for batch calibration. First, the conventional method for batch calibration finds a value for the parameter H by converging evaluation formulas into which the measurement data of the hemisphere portion is substituted. However, in order to converge the evaluation formula, measurement data obtained by measuring the hemisphere portion over a relatively wide range is required. However, when the measurement range of the hemisphere portion is wider, the arm is likely to interfere with the hemisphere portion, making it difficult to prepare sufficient measurement data for calibration. Second, the conventional method for batch calibration is unable to calibrate the parameter L and uses a parameter L that is fixed at a nominal value. Accordingly, when manufacturing a surface texture measuring apparatus, cumbersome work is required for assigning the nominal value of the parameter L and manufacturing costs increase. In addition, correction accuracy may be reduced by fixing the parameter L to the nominal value.

SUMMARY OF THE INVENTION

The present invention can solve at least one of the circumstances noted above and provides a method for calibrating parameters of a surface texture measuring apparatus that can easily calibrate at least one of respective parameters corresponding to a stylus length or an arm length.

The present invention is a method for calibrating parameters that calibrates at least one of a parameter L corresponding to the arm length and a parameter H corresponding to the stylus length, the method using a surface texture measuring apparatus provided with a stylus contacting a measured object, an arm provided with the stylus and supported by a rotary shaft so as to freely rotate, a displacement amount detection device detecting a displacement amount of the stylus in a first direction associated with rotating the arm, a relative movement mechanism that moves the stylus relative to the measured object such that the stylus scans the measured object in a second direction which is orthogonal to the first direction, a movement amount detection device detecting a relative movement amount of the stylus with respect to the measured object, and a measurer that obtains measurement data based on the displacement amount and the relative movement amount. The method includes a measurement step that obtains the measurement data by scanning a defined surface that has a planar shape or a shape of a portion of a spherical surface that changes in each of the first direction and the second direction; a correction step that obtains corrected data by correcting the measurement data based on the parameter L and the parameter H; a determination step to calculate roundness or straightness of the corrected data and to determine whether the calculated roundness or straightness is equal to or less than a predetermined value; and an adjustment step that increases or reduces at least one of the parameter L and the parameter H when the roundness or the straightness is determined to be greater than the predetermined value, and the correction step, the determination step, and the adjustment step are repeated until the roundness or the straightness is determined to be equal to or less than the predetermined value in the determination step.

In the present invention as described above, at least one of the parameters L and H is calibrated by using the measurement data obtained from one round of measurement when the defined surface is scanned and adjusting at least one of the parameters L and H until the parameter L and the parameter H reach a proper value. According to the present invention, the parameters L and H can be easily calibrated since the measurement operation only needs to be performed once. In addition, the present invention uses the measurement data obtained by scanning the defined surface in order to calibrate the parameter H, but does not require a measurement range as wide as the measurement range required for calibrating the parameter H in the conventional technology. Therefore, even in a case where the defined surface has the shape of a portion of a spherical surface, the arm does not interfere with the defined surface and sufficient measurement data for calibrating the parameter H can be obtained. Further, the present invention can perform calibration of the parameter L, which is not possible in the conventional technology. Accordingly, when manufacturing a surface texture measuring apparatus, there is no need for assigning a nominal value for the parameter L and manufacturing costs can be reduced. In addition, the correction accuracy can be improved by calibrating properly without fixing the parameter L. Therefore, according to the method for calibrating parameters of the present invention, at least one of the parameters L and H can be easily calibrated.

The method for calibrating parameters according to the present invention preferably further includes a plotting step that plots the corrected data into a two-dimensional graph, and the adjustment step increases or reduces at least one of the parameter L and the parameter H based on a pattern shape exhibited by the corrected data in the two-dimensional graph. In the present invention, the pattern shape exhibited by the corrected data in the two-dimensional calibration graph is affected by the parameters L and H, and therefore an adjustment amount, an increase/decrease direction, and the like for the parameters L and H can be determined based on the pattern shape. According to this method, an amount of time to adjust the parameters L and H can be shortened compared to when the parameters L and H are adjusted in a random manner.

In the method for calibrating parameters according to the present invention, preferably, the defined surface has the shape of a portion of a spherical surface and a vertical axis and a horizontal axis of the two-dimensional graph correspond to respective values in the corrected data expressed by polar coordinates. According to the present invention, the pattern shape exhibited by the corrected data in the two-dimensional graph becomes a flat straight line when the parameters L and H are in the normal range. Accordingly, by adjusting the parameters L and H while checking the pattern shape, matching the parameters L and H to a normal value is facilitated.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 5 is a schematic view illustrating parameters L and H of the first embodiment;

FIG. 13 illustrates a pattern shape exhibited by corrected data of the second embodiment.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Figure 1:
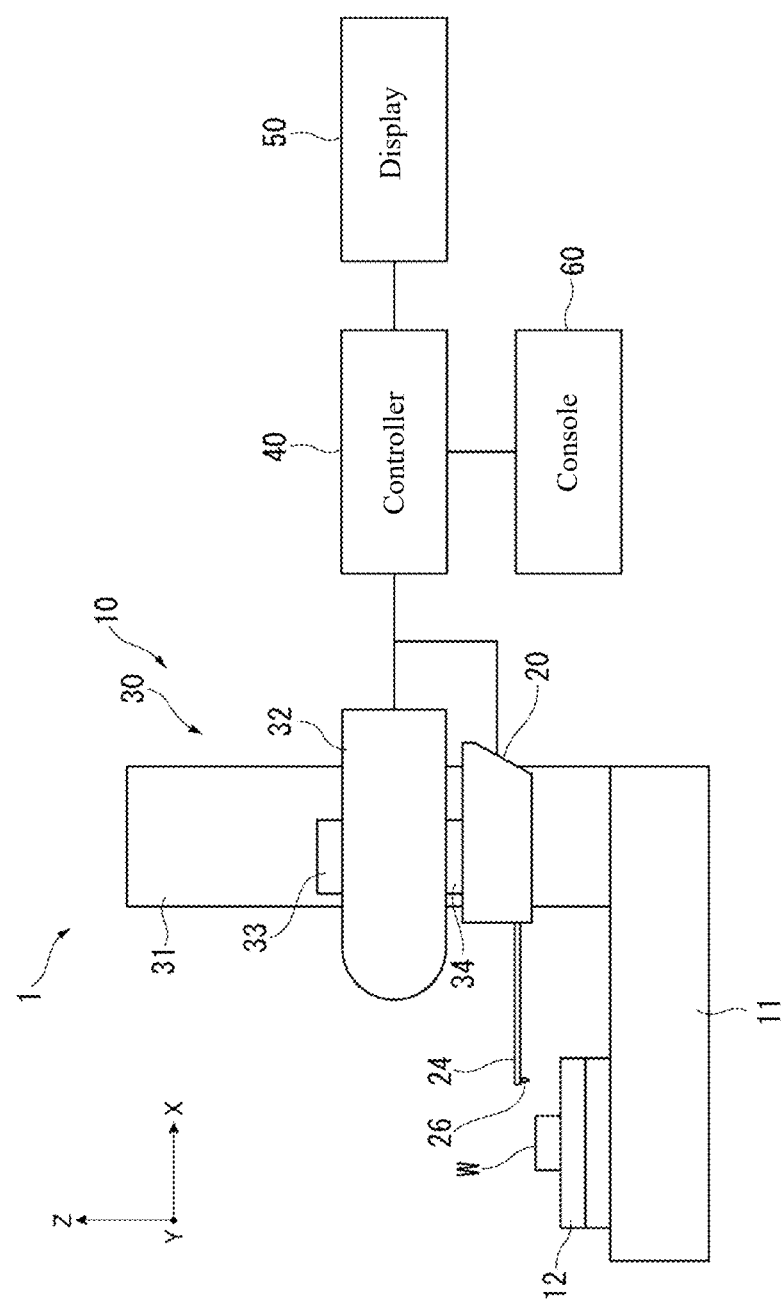
FIG. 1 is a schematic view illustrating a surface texture measuring apparatus according to a first embodiment of the present invention.

A first embodiment of the present invention is described with reference to the drawings. In FIG. 1, a surface texture measuring apparatus 1 of the present embodiment measures a surface texture of a measured object/measureable object by profiling and scanning a surface of the measured object, and includes an apparatus main body 10 where the measured object is placed, a controller 40 that controls the apparatus main body 10, and the like. FIG. 1 shows a work piece W which is an exemplary measured object.

Apparatus Main Body

The apparatus main body 10 of the present embodiment has a configuration substantially similar to that of a conventional apparatus. Hereafter, a configuration of the apparatus main body 10 is briefly described with reference to FIGS. 1 and 2. In the present embodiment, an up/down direction of the apparatus main body 10 is a Z axis direction (first direction), a single direction orthogonal to the Z axis is an X axis direction (second direction), and a direction orthogonal to each of the Z axis direction and the X axis direction is a Y axis direction.

As shown in FIG. 1, the apparatus main body 10 includes a base 11, a stage 12 arranged on the base 11, a detector 20, and a relative movement mechanism 30 that moves the stage 12 and detector 20 relative to each other.

The relative movement mechanism 30 includes a column 31 standing upright on a top surface of the base 11, a slider 32 supported on the column 31, a Z axis drive mechanism 33 that raises and lowers the slider 32 in the Z axis direction with respect to the column 31, and an X axis drive mechanism 34 that moves the detector 20 in the X axis direction with respect to the slider 32. The Z axis drive mechanism 33 and the X axis drive mechanism 34 are each configured by an actuator such as a feed screw mechanism. Also, the X axis drive mechanism 34 includes a movement amount detection device 341 to detect a movement amount of the detector 20 in the X axis direction. For example, the movement amount detection device 341 is a photoelectric type, a capacitive type, or a magnetic type encoder.

Figure 2:
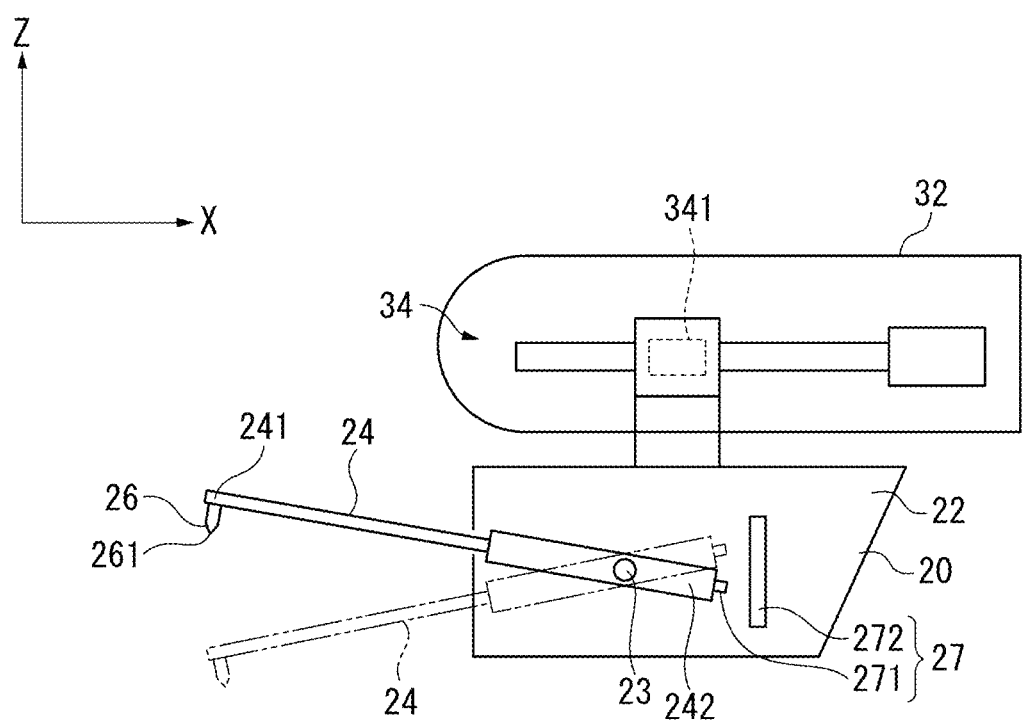
FIG. 2 is a schematic view illustrating a detector of the first embodiment.

As shown in FIG. 2, the detector 20 includes a bracket 22 suspensively supported by the X axis drive mechanism 34, an arm 24 supported so as to freely rotate by a rotary shaft 23 that is provided to the bracket 22, a stylus 26 arranged on a forefront end portion 241 of the arm 24, and a displacement amount detection device 27 that detects a displacement amount of the stylus 26 in the Z axis direction. The stylus 26 projects downward from the forefront end portion 241 of the arm 24 and includes a stylus head 261 that is provided to a forefront end of the stylus 26 and contacts the measured object. The stylus head 261 has an extremely small sphere shape, for example. The displacement amount detection device 27 is an encoder, for example, and includes an electrode 271 that integrally displaces with a base end portion 242 of the arm 24 (a site on the opposite side from the forefront end portion 241) and a scale 272 that detects the displacement of the electrode in the Z axis direction.

In the apparatus main body 10 of the present embodiment, when the X axis drive mechanism 34 displaces the detector 20 in the X axis direction while the stylus 26 is in contact with the measured object, the stylus 26 profiles and scans the measured object in the X axis direction while displacing the stylus 26 in the Z axis direction according to a surface height of the measured object. During the scan, the movement amount detection device 341 detects the movement amount of the detector 20 in the X axis direction (relative movement amount of the stylus 26 with respect to the measured object) and outputs a detection signal to the controller 40. In addition, the displacement amount detection device 27 detects the displacement amount of the stylus 26 in the Z axis direction and outputs a detection signal to the controller 40.

Controller

Figure 3:
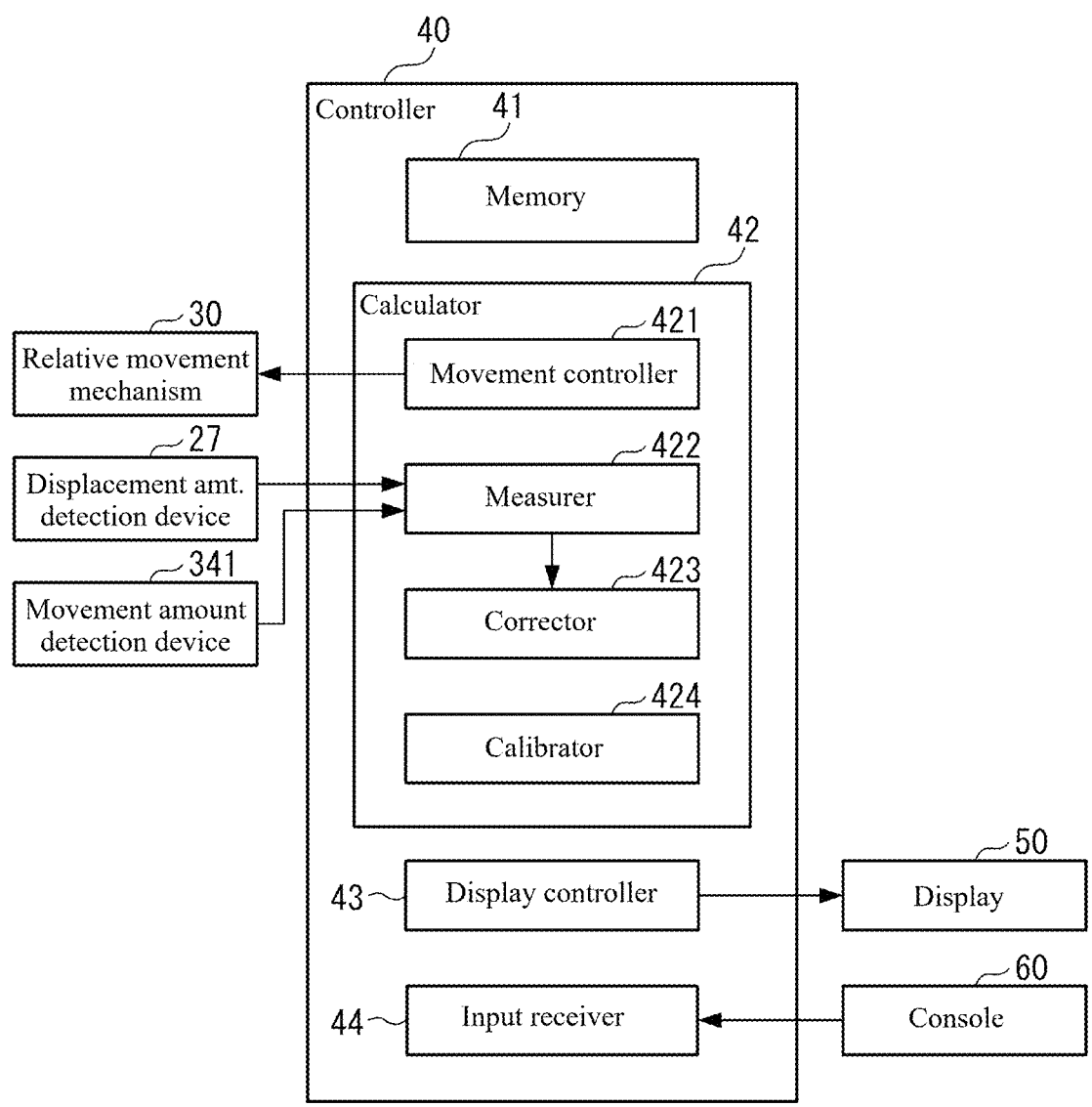
FIG. 3 is a block diagram illustrating a controller according to the first embodiment.

Next, the controller 40 is described with reference to FIG. 3. The controller 40 is configured by a computer such as a personal computer, and includes a memory 41 that is configured by a memory and the like, a calculator 42 that is configured by a central processing unit (CPU), and the like, a display controller 43 that displays on a display 50 information processed by the calculator 42, and an input receiver 44 that receives input information from a console 60. In addition, the calculator 42 serves as a movement controller 421, a measurer 422, a corrector 423, and a calibrator 424 by reading and executing a program stored in the memory 41.

The movement controller 421 controls movement of the detector 20 relative to the stage 12 by drive-controlling the relative movement mechanism 30. The measurer 422 obtains measurement data ($X_m$ and $Z_m$) at a predetermined pitch in the X axis direction based on the detection signals entered from the movement amount detection device 341 and the displacement amount detection device 27 respectively. The corrector 423 corrects the measurement data based on various parameters stored in the memory 41. The measurement data that is corrected may in some cases be referred to as corrected data below. The calibrator 424 performs a calibration process on the parameters stored in the memory 41. The controller 40 is connected to the display 50, the console 60, and the like. The display 50 is any desired display screen and the console 60 is a keyboard or a joystick, for example.

Correction of Measurement Data

Figure 4:
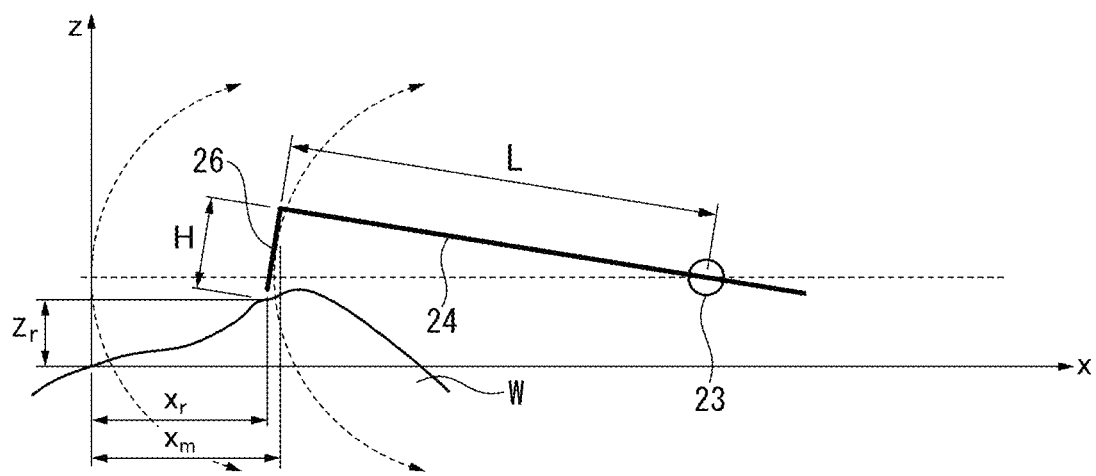
FIG. 4 is a schematic view illustrating measurement errors of the first embodiment.

As shown in FIG. 4, the measurement data ($X_m$ and $Z_m$) of the present embodiment includes errors due to a circular movement of the stylus 26. Therefore, the corrector 423 uses a predetermined parameter and performs a calculation process to remove the measurement errors due to the circular movement of the stylus 26. Accordingly, the corrected data ($X_r$ and $Z_r$) is calculated. For a correction method of the measurement data, refer to the method disclosed in Japanese Patent Laid-open Publication No. 2004-286457, for example. Specifically, based on the measurement data ($X_m$ and $Z_m$) and parameters L, H, and g, the corrected measurement data ($X_r$ and $Z_r$) can be calculated using formula 1 below.

$$X_r = X_m + L\left(1 - \sqrt{1 - \left(\frac{gZ_m}{L}\right)^2}\right) - H\frac{gZ_m}{L} \quad \text{[Formula 1]}$$

$$Z_r = gZ_m + H\left(1 - \sqrt{1 - \left(\frac{gZ_m}{L}\right)^2}\right)$$

In this example, the parameter L is a value that corresponds to a length of the arm 24, the parameter H is a value that corresponds to a length of the stylus 26, and the parameter g is a gain coefficient of the displacement amount detection device 27.

The parameters L and H are defined as illustrated in FIG. 5. In FIG. 5, a center axis line of the arm 24 which passes through the rotary shaft 23 is a base line A, and when the base line A is arranged parallel to the X axis direction, a line that passes through the stylus head 261 and is parallel to the Z axis direction (center axis line of the stylus 26) is a base line B. In addition, an intersection point of the base line A and the base line B is a base point P. In FIG. 5, which illustrates this configuration, the parameter L is a value that corresponds to the length of the arm 24 and is defined as a distance from a center axis C of the rotary shaft 23 which supports the arm 24 to the base point P. The parameter H is a value that corresponds to the length of the stylus 26 and is defined as a distance from the base point P to the center of the stylus head 261.

Calibration Jig

Figure 6:
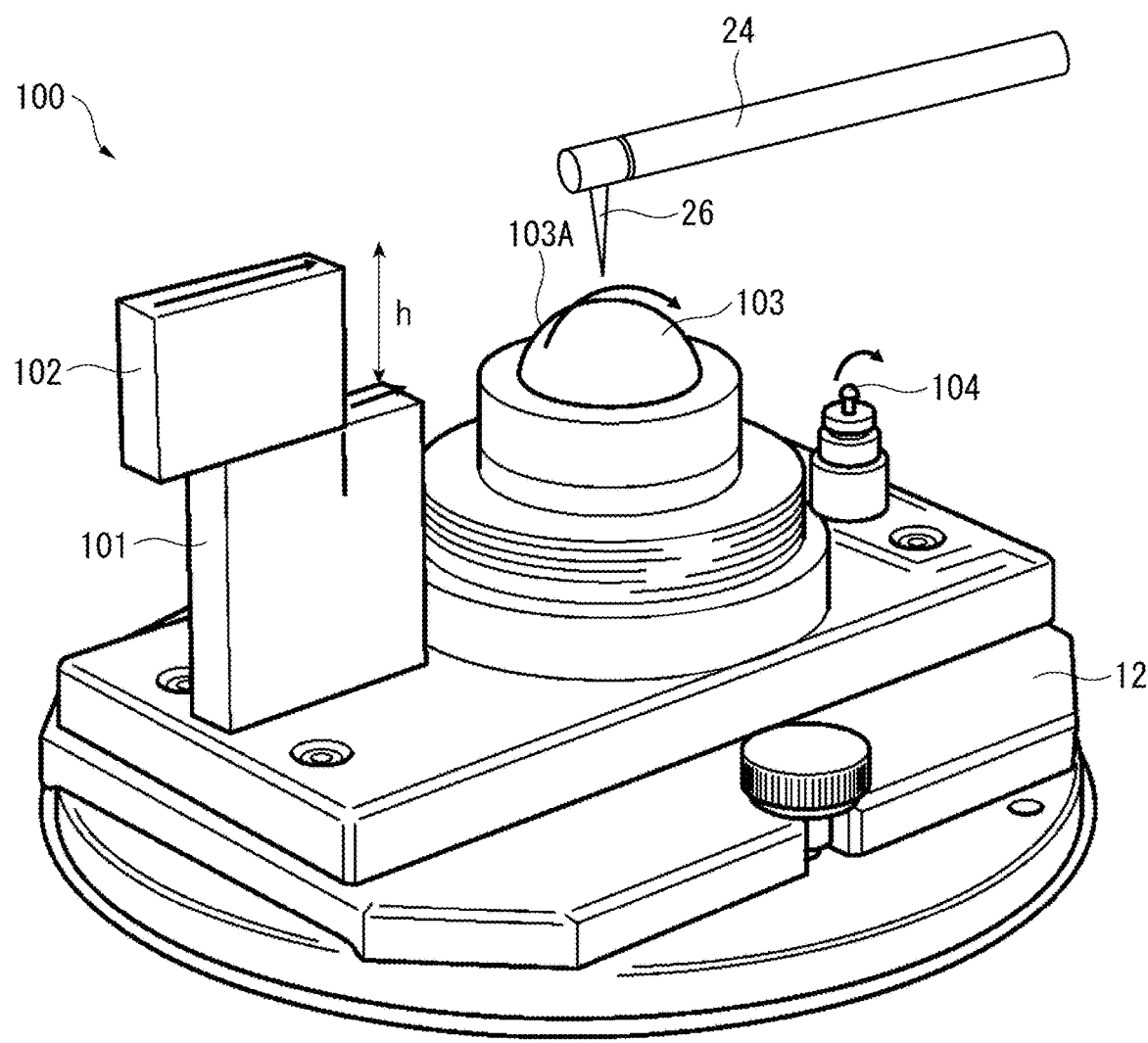
FIG. 6 is a perspective view illustrating a calibration jig used in the first embodiment.

As shown in FIG. 6, according to the present embodiment, each of the parameters L, H, and g is calibrated by measuring a calibration jig 100 that is used in a conventional method for batch calibration. The calibration jig 100 includes a base 101, a step portion 102 with a known height h with respect to the base 101, a hemisphere portion 103, and a sphere portion 104 having a diameter smaller than the hemisphere portion 103. In this example, the hemisphere portion 103 also includes a spherical surface 103A that is equivalent to a shape of a portion of a spherical surface, and is equivalent to a defined surface that changes in each of the Z axis direction and the X axis direction.

In the present embodiment, the parameter g is calibrated using the measurement results of the height h of the step portion 102, and the parameter L (parameter L of the present invention) and the parameter H (parameter H of the present invention) are calibrated using the measurement results of the spherical surface 103A of the hemisphere portion 103. A description is omitted in the present embodiment, but a radius (parameter r) of the stylus head 261 may be calibrated based on the measurement data of the sphere portion 104.

Calibration Method

Figure 7:
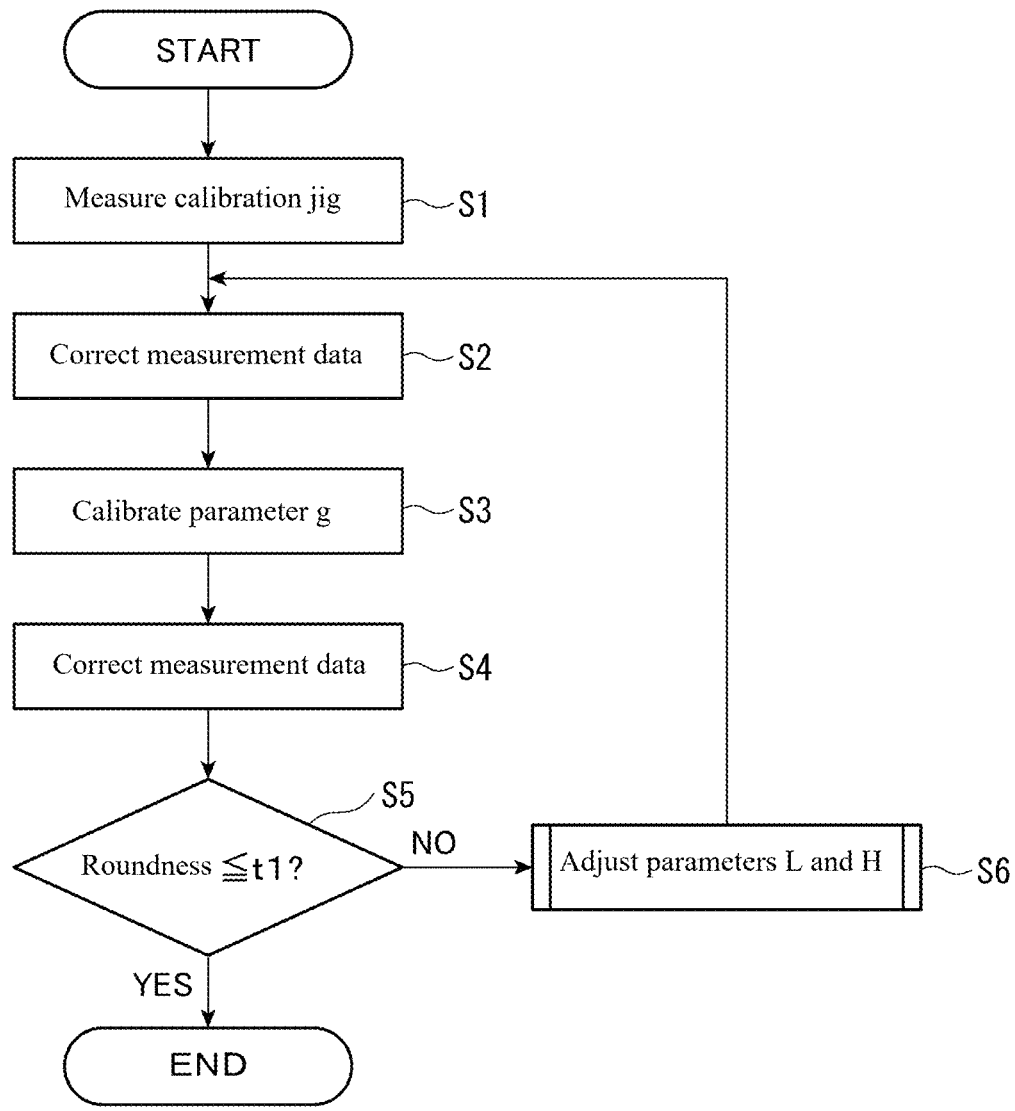
FIG. 7 is a flowchart illustrating a calibration process according to the first embodiment.

The method for calibrating the parameters L, H, and g according to the present embodiment is described with reference to the flowchart of FIG. 7. The memory 41 stores initial values (design values, for example) or calibration values from previous calibration for the parameters L, H, and g.

As a preliminary preparation, a user sets up the calibration jig 100 on the stage 12 and initiates a calibration process of the surface texture measuring apparatus 1. First, the movement controller 421 controls the X axis drive mechanism 34 such that the stylus 26 scans the respective top surfaces of the step portion 102 and the base 101, and the spherical surface 103A of the hemisphere portion 103 in that order in the X axis direction. The measurer 422 obtains the coordinates ($X_m$ and $Z_m$) of the stylus head 261 while scanning at the predetermined pitch in the X axis direction, based on each signal entered from the displacement amount detection device 27 and the movement amount detection device 341. Accordingly, the measurement data is obtained (step S1). The measurement range of the hemisphere portion 103 is preferably a range on one side in the X axis direction (for example, a range of a 45° central angle) with respect to a vertex of the hemisphere portion 103.

Next, the corrector 423 corrects the measurement data based on the parameters L, H, and g (step S2), and the calibrator 424 calibrates the parameter g based on the corrected data for the respective top surfaces of the step portion 102 and the base 101 (step S3). Specifically, a difference is calculated between a Z coordinate $Z_r$ when the top surface of the step portion 102 is measured and the Z coordinate $Z_r$ when the top surface of the base 101 is measured, the parameter g is calculated to bring the difference equal to the height h of the step portion 102, and the value of the parameter g stored in the memory 41 is updated to the calculated value.

Next, the corrector 423 corrects the measurement data based on the parameters L, H, and g (parameter g is the value calibrated in step S3) (step S4). Then, the calibrator 424 calculates roundness based on the corrected data of the spherical surface 103A and determines whether the calculated roundness is equal to or less than a predetermined value t1 (step S5). In this example, the predetermined value t1 is any value defined in advance and is set to an upper limit value of a case where the pattern shape of the corrected data of a first calibration graph described hereafter is in a normal range, for example.

Figure 8:
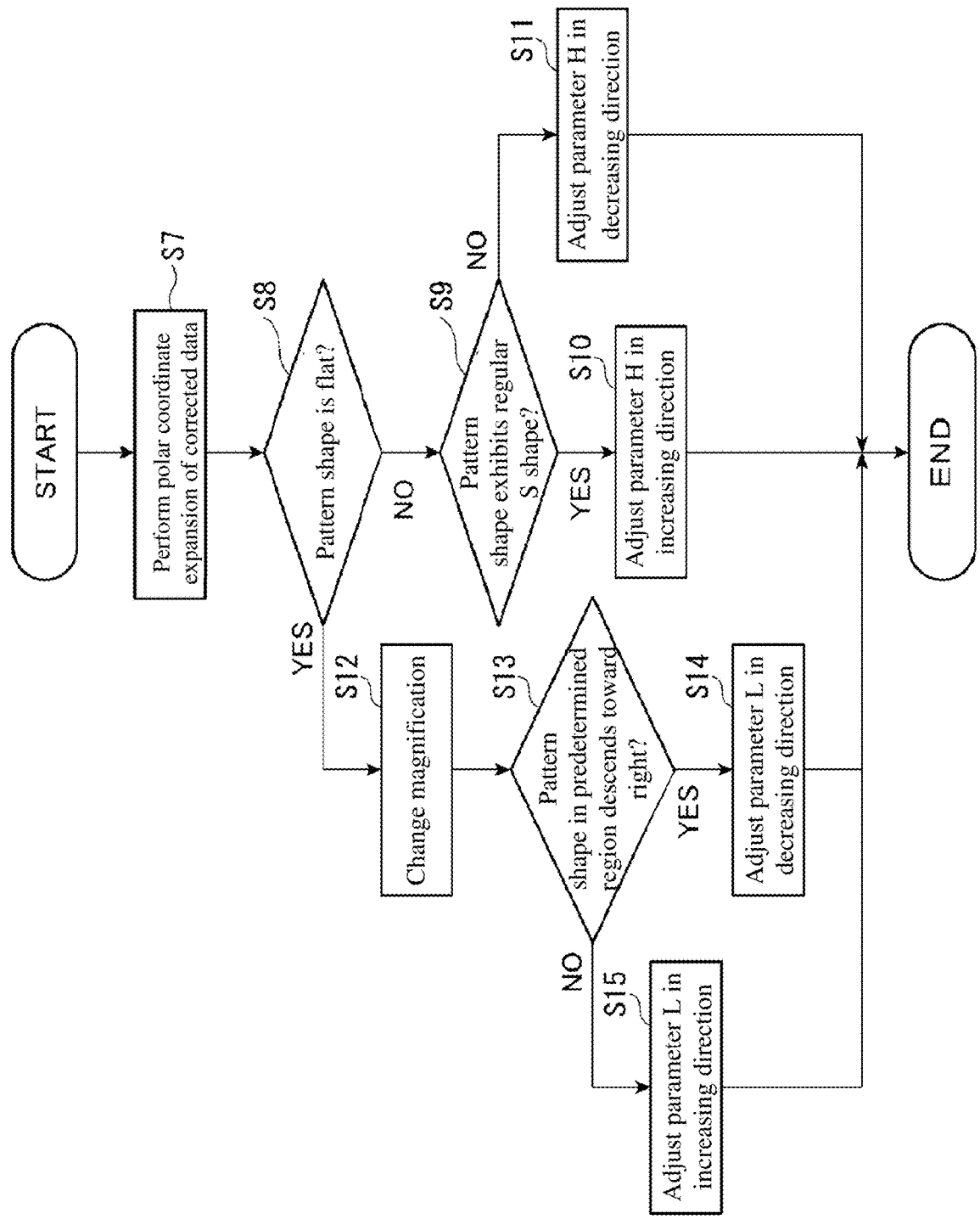
FIG. 8 is a flowchart illustrating a part of the calibration process according to the first embodiment.

When the calculated roundness is determined to be greater than the predetermined value t1 (step S5: NO), the calibrator 424 performs an adjustment process to increase or reduce one of the parameters L and H (step S6). Step S6 is concretely described below with reference to the flow chart of FIG. 8.

First, the calibrator 424 performs polar coordinate expansion of the corrected data of the spherical surface 103A. Specifically, the calibrator 424 converts the corrected data of rectangular coordinates expressed by ($X_r$ and $Z_r$) to the corrected data of polar coordinates expressed by (θ and r), and plots the corrected data into a predetermined two-dimensional graph (hereafter referred to as "first calibration graph") (step S7: plotting step). In this example, the horizontal axis of the first calibration graph corresponds to a value θ of the corrected data and the vertical axis corresponds to a value r of the corrected data. The value θ and the value r according to the present embodiment are calculated as residuals of fitting a circle to the corrected data by least squares. In step S7, the display controller 43 displays on the display 50 the first calibration graph prepared by the calibrator 424.

Figure 9:
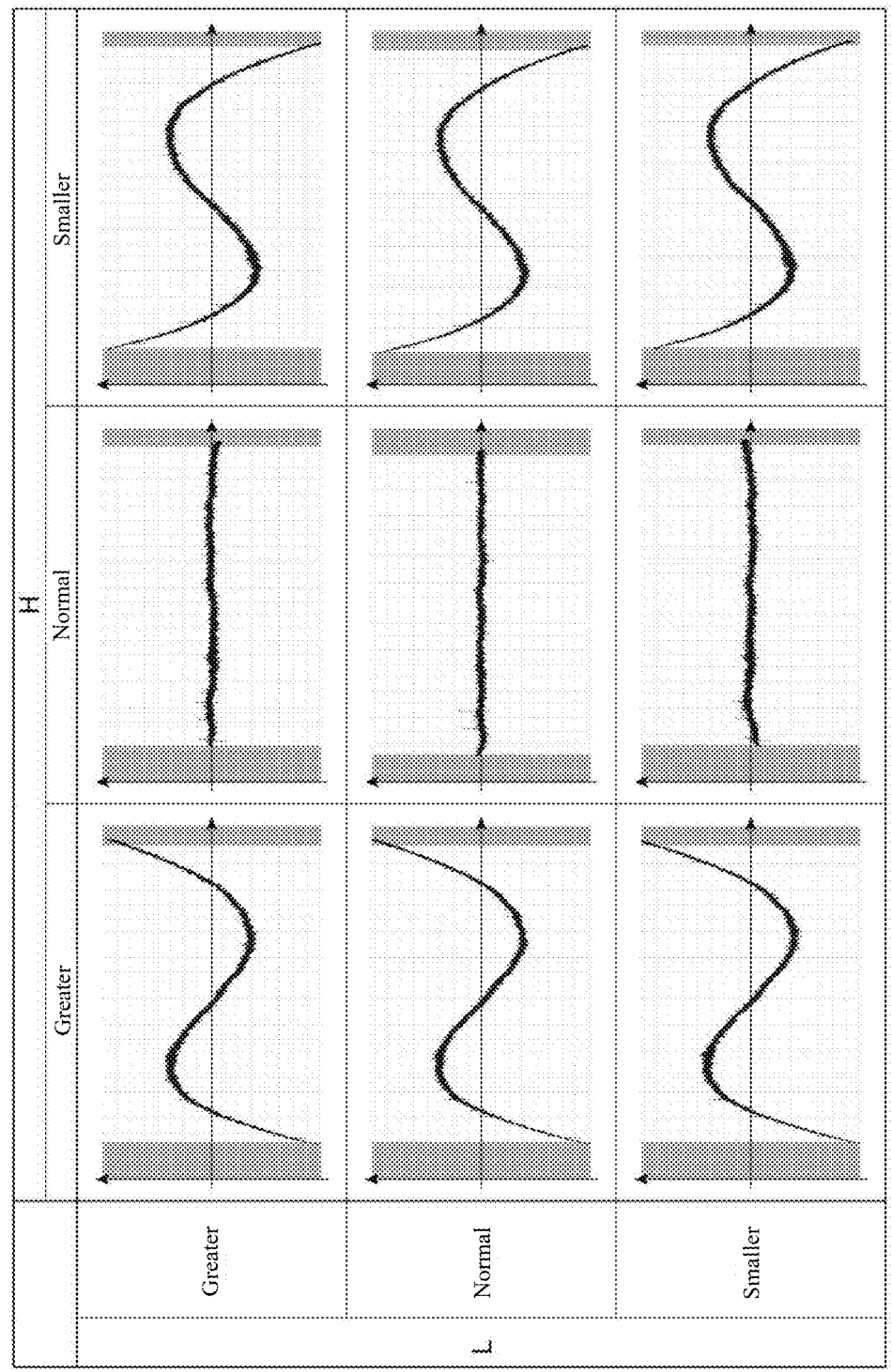
FIG. 9 is a graph illustrating a relationship between the parameters L and H and a first calibration graph of the first embodiment.
Figure 10:
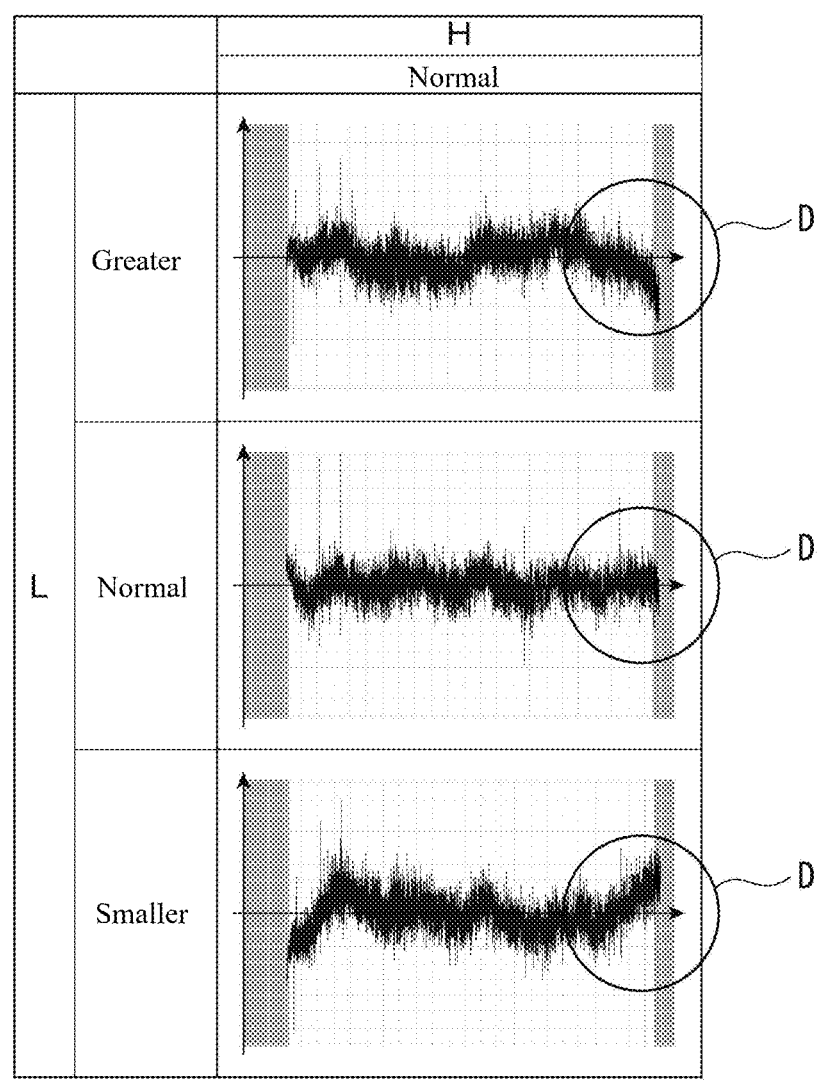
FIG. 10 is an enlarged view of a vertical axis range of the first calibration graphs in FIG. 9.

Next, the user checks the first calibration graph displayed on the display 50 and adjusts one of the parameters L and H based on the pattern shape exhibited by the corrected data (steps S8 to S15). Here, the pattern shape exhibited by the corrected data in the first calibration graph is affected by the parameters L and H. FIGS. 9 and 10 show the relationship of the pattern shape and the parameters L and H. FIG. 9 shows first calibration graphs classified based on whether the values of the parameters L and H are within a proper range. FIG. 10 shows an enlargement of the vertical axis range of a portion of the first calibration graphs from FIG. 9.

As shown in FIG. 9, when the parameter H is outside the normal range, the pattern shape exhibited by the corrected data in the first calibration graph shows an S shape or an inverted S shape. Specifically, when the value of the parameter H is smaller than the normal range, the pattern shape exhibits the S shape, and when the value of the parameter H is greater than the normal range, the pattern shape exhibits the inverted S shape.

In addition, as shown in FIG. 10, when the parameter H is within the normal range, the pattern shape exhibited by the corrected data in the first calibration graph shows different shapes when the parameter L is within the normal range and when the parameter L is outside the normal range. In the present embodiment, in an area of the measurement range farther from the vertex of the hemisphere portion 103 (area indicated by D in FIG. 10), the pattern shape descends toward the right when the value of the parameter L is greater than the normal range and ascends toward the right when the value of the parameter L is smaller than the normal range.

Accordingly, the user determines whether the pattern shape exhibited by the corrected data in the first calibration graph applies to one of the above noted cases and adjusts one of the parameters L and H based on the determination results. For example, when the user determines that the pattern shape is not flat (step S8: NO) and exhibits a regular S shape (step S9: YES), the parameter H is adjusted in an increasing direction via the console 60 (step S10). Also, when the user determines that the pattern shape is not flat (step S8: NO) and exhibits the inverted S shape (step S9: NO), the parameter H is adjusted in a decreasing direction via the console 60 (step S11).

When the pattern shape is superficially flat (step S8: YES), the user enlarges the view of an r axis range of the calibration graph via the console 60 (step S12). Then, when the user determines that the pattern shape exhibited by the corrected data in a predetermined area of the measurement range descends toward the right (step S13: YES), the parameter L is adjusted in the decreasing direction via the console 60. On the other hand, when the user determines that the pattern shape ascends toward the right (step S13: NO), the parameter L is adjusted in the increasing direction via the console 60.

Respective adjustment amounts for the parameters L and H in steps S10, S11, S14, and S15 noted above may be a predetermined value. In addition, when the pattern shape is replaced while repeating step S6, the adjustment amount may be reduced. Alternatively, the more the pattern shape changes from the flat shape, the more the adjustment amount may be increased. When executing one of the above noted steps S10, S11, S14, and S15, the calibrator 424 updates the parameter L or the parameter H in the memory 41 to the value after adjustment. The above completes step S6.

After completing step S6 noted above, the process returns to step S2 in FIG. 7 and performs steps S2 to S5 again. When step S5 is NO, step S6 is performed again. In other words, the calibration method according to the present embodiment repeats steps S2 to S6 until the roundness is equal to or less than the predetermined value t1.

When the roundness is equal to or less than the predetermined value t1 (step S5: YES), the calibrator 424 determines that the parameters L and H stored in the memory 41 are within the normal range. In other words, it is determined that the parameters L and H are calibrated and the flow ends.

A description is omitted in the above, but the value of the radius (parameter r) of the stylus head 261 may be calibrated based on the measurement data obtained when the sphere portion 104 of the calibration jig 100 is scanned. The method for calibrating the parameter r can be performed using a similar method as in the conventional technology.

Effect of First Embodiment

The method for calibrating parameters according to the present embodiment includes a measurement step that obtains the measurement data by scanning the spherical surface 103A of the hemisphere portion 103 (defined surface) (step S1); a correction step that obtains the corrected data by correcting the measurement data based on the parameters L and H (step S4); a determination step to calculate the roundness of the corrected data and to determine whether the calculated roundness is equal to or less than the predetermined value t1 (step S5); and an adjustment step that increases or reduces at least one of the parameters L and H when the roundness is determined to be greater than the predetermined value t1 (step S6), and the correction step, the determination step, and the adjustment step are repeated until the roundness is determined to be equal to or less than the predetermined value t1.

In the method for calibrating parameters according to the present embodiment, the parameters L and H are adjusted until the parameters L and H reach a proper value by using the measurement data obtained from one round of measurement when the spherical surface 103A of the hemisphere portion 103 is scanned. In other words, the parameters L and H can be easily calibrated since the measurement operation only needs to be performed once. In addition, the present embodiment uses the measurement data obtained by scanning the spherical surface 103A of the hemisphere portion 103, similar to the conventional technology, but does not require a measurement range as wide as the measurement range which is required for calibrating the parameter H in the conventional technology. Therefore, the arm 24 does not interfere with the hemisphere portion 103 and sufficient measurement data for calibrating the parameter H can be obtained. In addition, the present embodiment can perform calibration of the parameter L, which is not possible in the conventional technology. Accordingly, when manufacturing the surface texture measuring apparatus 1, there is no need for assigning a nominal value for the parameter L and the manufacturing costs can be reduced. In addition, the correction accuracy can be improved by properly calibrating without fixing the parameter L. The parameter g can be calibrated similarly to the conventional technology by using the same calibration jig 100 as in the conventional technology. Therefore, according to the method for calibrating parameters of the present embodiment, the parameters L and H can be easily calibrated without losing the advantage of the conventional method for batch calibration.

The method for calibrating parameters of the present embodiment further includes the plotting step to plot the corrected data of the spherical surface 103A into the first calibration graph (step S7) and the adjustment step adjusts at least one of the parameters L and H based on the pattern shape exhibited by the corrected data in the first calibration graph. In the present embodiment, the pattern shape exhibited by the corrected data in the first calibration graph is affected by the parameters L and H, and therefore an increase/decrease direction, an adjustment amount, and the like for the parameters L and H can be determined based on the pattern shape. According to this method, compared to when the parameters L and H are adjusted in a random manner, an amount of time to adjust the parameters L and H can be shortened.

In the method for calibrating parameters of the present embodiment, the vertical axis and the horizontal axis of the first calibration graph correspond to the value r and value θ of the corrected data expressed by polar coordinates. According to this method, the pattern shape exhibited by the corrected data in the first calibration graph becomes a flat straight line when the parameters L and H are in the normal range. Therefore, by adjusting the parameters L and H while checking the pattern shape, matching the parameters L and H to a normal value is facilitated. The value θ and the value r of the corrected data are calculated as the residuals of fitting a circle to the corrected data by least squares. Therefore, the radius of the spherical surface 103A and the like may be unknown.

Second Embodiment

A second embodiment of the present invention is described. The second embodiment is substantially similar to the first embodiment other than that the calibration jig used and the method for calibrating the parameters L and H are different.

Calibration Jig

Figure 11:
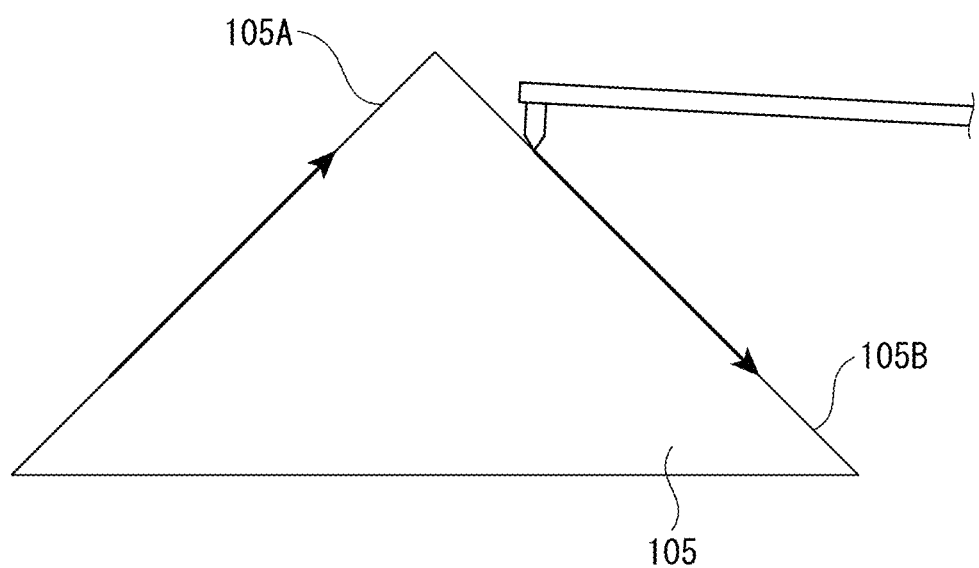
FIG. 11 is a schematic view illustrating a prism used in a second embodiment of the present invention.

A calibration jig of the second embodiment includes a prism 105 shown in FIG. 11 in addition to the configuration of the calibration jig 100 (base 101, step portion 102, hemisphere portion 103) according to the first embodiment. The prism 105 includes a first surface 105A and a second surface 105B that are arranged with an angle between each other. In the second embodiment, the first surface 105A and the second surface 105B are each equivalent to the defined surface of the present invention. Specifically, the first surface 105A and the second surface 105B each has a planar shape that changes in each of the Z axis direction and the X axis direction. The first surface 105A and the second surface 105B bear a symmetrical relationship to virtual faces parallel to each of the Z axis direction and the Y axis direction.

Calibration Method

Figure 12:
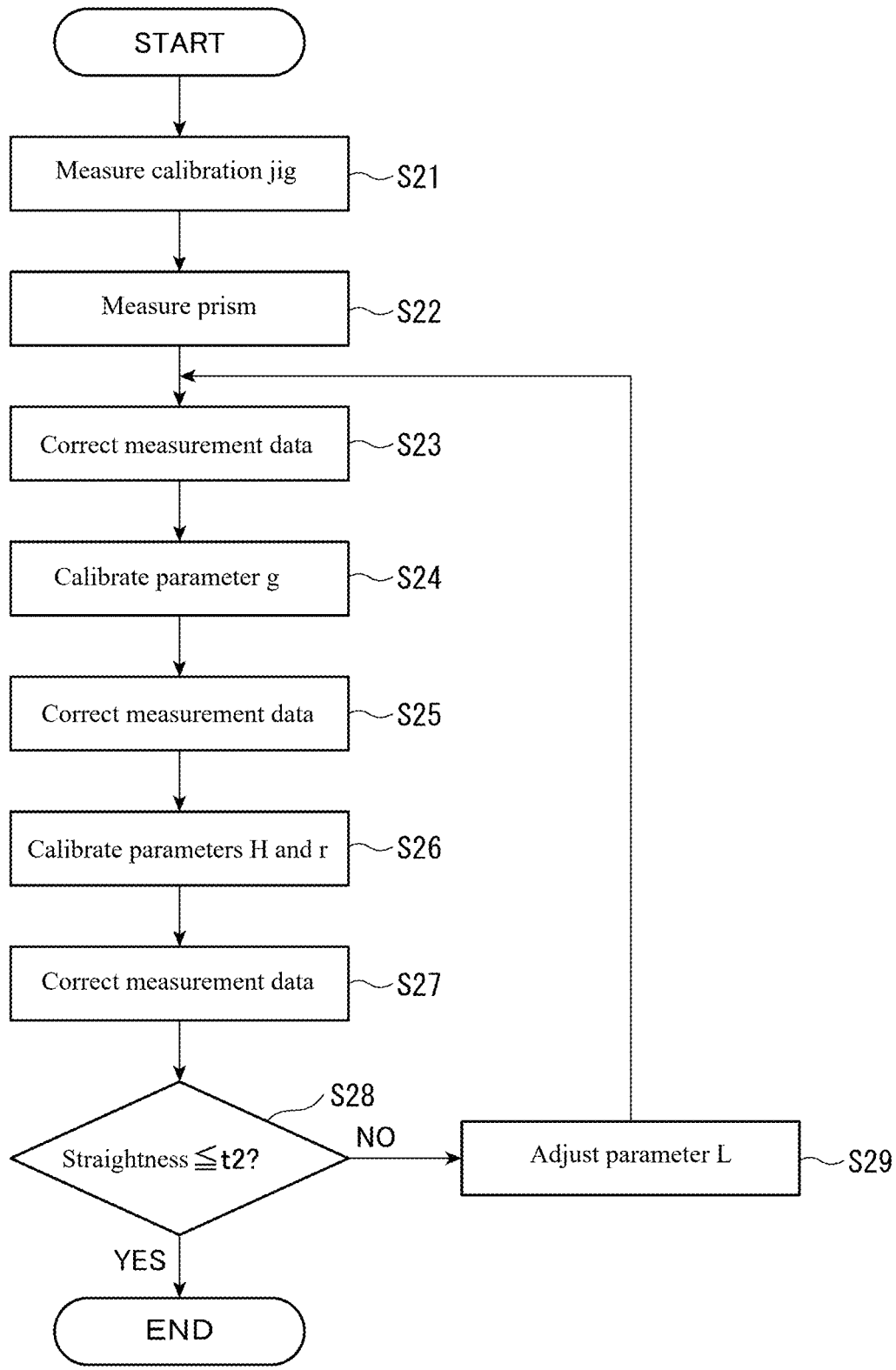
FIG. 12 is a flowchart illustrating a calibration process according to the second embodiment.

A method for calibrating the parameters L, H, and g according to the second embodiment is described with reference to the flowchart of FIG. 12. The memory 41 stores initial values (design values, for example) or calibration values from previous calibration for the parameters L, H, and g.

As a preliminary preparation, the user sets up the calibration jig 100 and the prism 105 on the stage 12 and initiates the calibration process of the surface texture measuring apparatus 1. First, the movement controller 421 controls the X axis drive mechanism 34 such that the stylus 26 scans each of the calibration jig 100 (step portion 102, base 101, hemisphere portion 103, and sphere portion 104) and the prism 105 in the X axis direction. The measurer 422 obtains, based on each signal entered from the displacement amount detection device 27 and the movement amount detection device 341, the coordinates ($X_m$ and $Z_m$) of the stylus head 261 while scanning at the predetermined pitch in the X axis direction. Accordingly, the measurement data of the calibration jig 100 and the measurement data of the prism 105 are obtained (step S21 and S22). In step S22, as shown in FIG. 11, the first surface 105A and the second surface 105B of the prism 105 are respectively scanned.

Next, similarly to the first embodiment, the corrector 423 corrects the measurement data based on the parameters L, H, and g (step S23), and the calibrator 424 calibrates the parameter g based on the corrected data for each of the step portion 102 and the base 101 (step S24).

Next, the corrector 423 corrects the measurement data based on the parameters L, H, and g (parameter g is the value calibrated in step S24) (step S25), and the calibrator 424 calibrates the parameters H and r based on the corrected data for each of the hemisphere portion 103 and sphere portion 104 (step S26). In this example, unlike in the first embodiment, the method for calibrating the parameters H and r uses a similar method as in the conventional technology. For example, refer to Japanese Patent Laid-open Publication No. 2004-286457 for a specific method. The parameters H and r are updated to the calibrated values.

Next, the corrector 423 corrects the measurement data of the prism 105 based on the parameters L, H, and g (parameter H is the value calibrated in step S26) (step S27). Then, the calibrator 424 calculates straightness based on the corrected data of the prism 105 and determines whether the calculated straightness is equal to or less than a predetermined value t2 (step S28). Here, the straightness may be calculated based on the corrected data of the first surface 105A or the corrected data of the second surface 105B of the prism 105. Alternatively, an average value of the straightness corresponding to the first surface 105A and the straightness corresponding to the second surface 105B may be calculated and the average value may be compared to the predetermined value t2. The predetermined value t2 is any value defined in advance and is set to an upper limit value of a case where the pattern shape of the corrected data for a second calibration graph described hereafter is in a normal range, for example.

Next, when the calculated straightness is determined to be greater than the predetermined value t2 (step S28: NO), the calibrator 424 performs an adjustment process to increase or reduce the parameter L (step S29).

Hereafter, step S29 is concretely described. First, the calibrator 424 plots the corrected data of the first surface 105A and the second surface 105B of the prism 105 into a predetermined two-dimensional graph (hereafter, referred to as "second calibration graph"). In this example, the horizontal axis of the second calibration graph corresponds to the value $X_r$ of the corrected data and the vertical axis of the second calibration graph corresponds to the value $Z_r$ of the corrected data. In addition, the display controller 43 displays on the display 50 the second calibration graph created by the calibrator 424.

Figure 14:
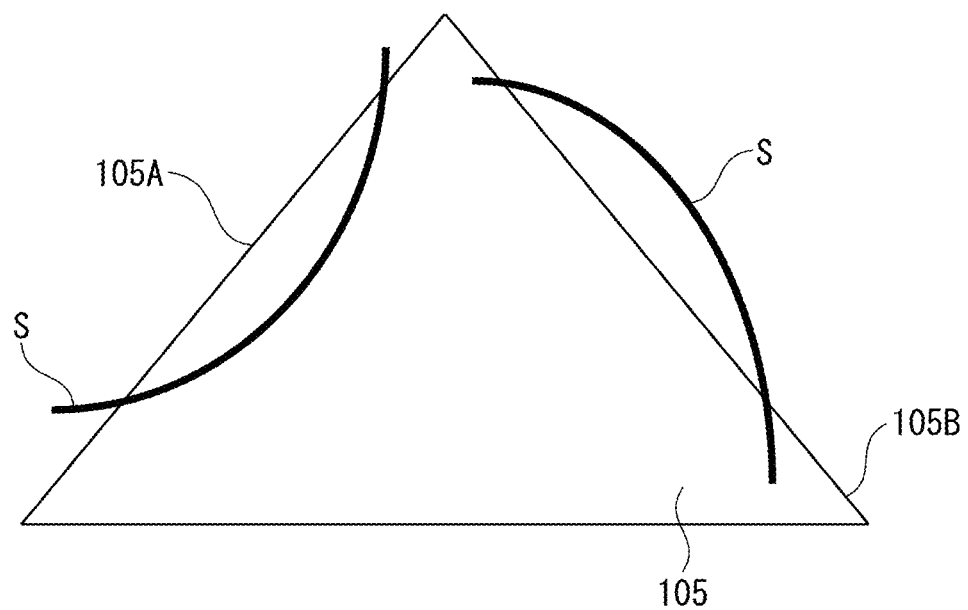
FIG. 14 illustrates a pattern shape exhibited by the corrected data of the second embodiment.

Next, the user checks the second calibration graph displayed on the display 50 and adjusts the parameter L based on the pattern shape exhibited by the corrected data. Here, the pattern shape exhibited by the corrected data in the second calibration graph is affected by the parameter L. FIGS. 13 and 14 show relationships of the pattern shape with respect to the first surface 105A and the second surface 105B. When the parameter L is smaller than the normal range, the pattern shape becomes a bulging pattern shape S as shown in FIG. 13. On the other hand, when the parameter L is greater than the normal range, as shown in FIG. 14, the pattern shape S bulges in an opposite direction from FIG. 13. In both cases, the pattern shape corresponding to the first surface 105A and the pattern shape corresponding to the second surface 105B bulge toward the same side.

Accordingly, the user determines whether the pattern shape exhibited by the corrected data in the second calibration graph applies to one of the above noted cases and adjusts the parameter L based on the determination result. For example, when the user determines that the pattern shape bulges as shown in FIG. 13, the parameter L is adjusted in the increasing direction. On the other hand, when the user determines that the pattern shape bulges as shown in FIG. 14, the parameter L is adjusted in the decreasing direction. The adjustment amount for the parameter L may be a predetermined value. In addition, the adjustment amount may be reduced when the bulge direction of the pattern shape is swapped while repeating the flow chart of the calibration process. Alternatively, the adjustment amount may be increased when the pattern shape bulges greatly, and the adjustment amount may be decreased when the pattern shape bulges little.

After completing step S29, the process returns to step S23 and performs steps S23 to S28 again. When step S28 is NO, step S29 is performed again. Accordingly, steps S23 to S29 are repeated until the straightness is equal to or less than the predetermined value t2. When the straightness is equal to or less than the predetermined value t2 (step S28: YES), the calibrator 424 determines that the value of the parameter L is within the normal range. In other words, it is determined that the parameter L is calibrated and the flow ends.

In the second embodiment, the bulge directions of the pattern shape may be opposite in the pattern shape corresponding to the first surface 105A and the pattern shape corresponding to the second surface 105B. In this case, because adjustment of the parameter L cannot be continued, the value of the parameter L with the smallest straightness in the corrected data from among past parameters L may be stored as the value of the latest parameter L.

Effect of Second Embodiment

The method for calibrating parameters according to the second embodiment includes a measurement step that obtains measurement data by scanning the first surface 105A and the second surface 105B of the prism 105 (step S22); a correction step that obtains corrected data by correcting the measurement data based on the parameters L and H (step S27); a determination step to calculate the straightness of the corrected data and to determine whether the straightness is equal to or less than the predetermined value t2 (step S28); and an adjustment step that increases or reduces the parameter L when the straightness is determined to be greater than the predetermined value t2 (step S29), and the correction step, the determination step, and the adjustment step are repeated until the straightness is determined to be equal to or less than the predetermined value t2.

In the second embodiment noted above, the parameter L is adjusted until the parameter L reaches a proper range by using the measurement data obtained from one round of measurement when the first surface 105A and the second surface 105B of the prism 105 are scanned. In other words, the parameter L can be easily calibrated since the measurement operation only needs to be performed once. In addition, similarly to the first embodiment, the second embodiment can perform the calibration of the parameter L which was not possible in the conventional technology. Accordingly, when manufacturing the surface texture measuring apparatus 1, there is no need for assigning a nominal value for the parameter L and the manufacturing costs can be reduced. In addition, the correction accuracy can be improved by calibrating properly without fixing the parameter L. The parameters H and g can be calibrated similarly to the conventional technology using the same calibration jig 100 as in the conventional technology. Therefore, according to the method for calibrating parameters of the second embodiment, the parameter L can be easily calibrated without losing the advantage of the conventional method for batch calibration.

Modifications

The present invention is not limited to the embodiments described above and includes modifications within a scope capable of achieving the advantages of the present invention.

The method for calibrating parameters according to the present invention can be applied to a surface texture measuring apparatus that has at least one of an upward stylus and a downward stylus. For example, a surface texture measuring apparatus of a vertical measurement type may set two types of the parameter H that correspond to the upward stylus and the downward stylus respectively. In the surface texture measuring apparatus of the vertical measurement type, because each dimension of the upward stylus and the downward stylus is short, generally the effect of the first embodiment is more evident.

In each of the embodiments, the user checks the first calibration graph or the second calibration graph displayed on the display 50 and manually adjusts the parameters L and H. However, the present invention is not limited to this. For example, when the calculator 42 serves as an analyzer that analyzes the pattern shape exhibited by the corrected data in the first calibration graph or the second calibration graph, the analyzer may perform the adjustment step of each embodiment.

In each of the embodiments, the parameters L and H are adjusted based on the first calibration graph or the second calibration graph. However, the present invention is not limited to this. In other words, the method for adjusting the parameters L and H is not limited to a method based on the first calibration graph or the second calibration graph, and may be a method to check the roundness or straightness every time the parameter H or the parameter L is increased or decreased by a predetermined value. In addition, in the embodiments noted above, both the parameters L and H are calibrated, but when one of the parameters is within the normal range, the method may calibrate only the other parameter.

In the first embodiment, the parameters L and H are calibrated based on the measurement data of the hemisphere portion 103, but the parameters L and H may be calibrated based on the measurement data obtained by scanning the spherical surface of the sphere portion 104. In addition, in the first embodiment, the horizontal axis and the vertical axis of the first calibration graph respectively correspond to the value θ and the value r of the corrected data expressed by polar coordinates, but may correspond to the value $X_r$ and the value $Z_r$ expressed by rectangular coordinates In the second embodiment, the first surface 105A and the second surface 105B of the prism 105 are respectively scanned as a reference surface, but the present invention is not limited to this and the parameter L may be adjusted based on the measurement data obtained by scanning one of the first surface 105A and the second surface 105B.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for calibrating parameters that calibrates at least one of a parameter L corresponding to an arm length and a parameter H corresponding to a stylus length using a surface texture measuring apparatus provided with:
   a stylus that contacts a measurable object;
   an arm provided with the stylus and supported by a rotary shaft so as to freely rotate;
   a displacement amount detection device detecting a displacement amount of the stylus in a first direction associated with rotating the arm;
   a relative movement mechanism that moves the stylus relative to the measured object such that the stylus scans the measured object in a second direction which is orthogonal to the first direction;
   a movement amount detection device detecting a relative movement amount of the stylus with respect to the measured object; and
   a measurer that obtains measurement data based on the displacement amount and the relative movement amount,
the method comprising:
   obtaining the measurement data by scanning a surface that has one of a planar shape or a shape of a portion of a spherical surface that changes in each of the first direction and the second direction;
   obtaining corrected data by correcting the measurement data based on the parameter L and the parameter H;
   calculating one of roundness or straightness of the corrected data and to determine whether the calculated one of roundness or straightness is less than or equal to a predetermined value; and one of increasing or reducing at least one of the parameter L and the parameter H when the one of roundness or the straightness is determined to be greater than the predetermined value, and repeating the obtaining corrected data, the calculating one of roundness or straightness, and the one of increasing or reducing, until the one of roundness or the straightness is determined to be less than or equal to than the predetermined value in the calculating one of roundness or straightness.

2. The method for calibrating parameters of the surface texture measuring apparatus according to claim 1, further comprising plotting the corrected data into a two-dimensional graph, wherein:

the one of increasing or reducing comprises one of increasing or reducing at least one of the parameter L and the parameter H based on a pattern shape exhibited by the corrected data in the two-dimensional graph.

3. The method for calibrating parameters of the surface texture measuring apparatus according to claim 2, wherein:

the defined surface has a shape of a portion of a spherical surface, and a vertical axis and a horizontal axis of the two-dimensional graph correspond to respective values in the corrected data expressed by polar coordinates.

* * * * *